United States Patent
Toskala et al.

(10) Patent No.: US 7,133,434 B1
(45) Date of Patent: Nov. 7, 2006

(54) MAKING MEASUREMENTS ON PARALLEL FREQUENCIES IN A RADIO COMMUNICATIONS DEVICE

(75) Inventors: Antti Toskala, Helsinki (FI); Harri Holma, Espoo (FI); Seppo Hämäläinen, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/424,623

(22) PCT Filed: May 29, 1998

(86) PCT No.: PCT/FI98/00460

§ 371 (c)(1),
(2), (4) Date: Mar. 27, 2000

(87) PCT Pub. No.: WO98/54849

PCT Pub. Date: Dec. 3, 1998

(30) Foreign Application Priority Data

May 30, 1997 (FI) ..................... 972299

(51) Int. Cl.
*H04B 1/69* (2006.01)
*H04L 27/06* (2006.01)

(52) U.S. Cl. ..................... 375/148; 375/343
(58) Field of Classification Search ............ 375/144, 375/148, 147, 150, 152, 343, 349; 370/203, 370/335, 320, 342; 455/132, 133, 134, 135, 455/136, 137, 138, 139
See application file for complete search history.

(56) References Cited

U.S. PATENT DOCUMENTS

| 5,101,501 | A | | 3/1992 | Gilhousen et al. ............ 455/33 |
| 5,345,602 | A | | 9/1994 | Wiedemann et al. ....... 455/137 |
| 5,691,974 | A | * | 11/1997 | Zehavi et al. ............... 370/203 |
| 5,724,666 | A | * | 3/1998 | Dent ....................... 455/562.1 |
| 5,914,947 | A | * | 6/1999 | Saito .......................... 370/337 |
| 5,940,452 | A | * | 8/1999 | Rich .......................... 375/347 |
| 6,081,547 | A | * | 6/2000 | Miya ......................... 375/130 |
| 6,167,269 | A | * | 12/2000 | Kondo ....................... 455/437 |
| 6,169,888 | B1 | * | 1/2001 | Lindenmeier et al. ... 455/277.2 |

(Continued)

FOREIGN PATENT DOCUMENTS

DE  4425354 A1  2/1995

(Continued)

OTHER PUBLICATIONS

Patent Abstracts of Japan, JP 06253074.

*Primary Examiner*—Khanh Tran
*Assistant Examiner*—Sam K. Ahn
(74) *Attorney, Agent, or Firm*—Perman & Green, LLP

(57) ABSTRACT

A diversity receiver in a radio apparatus has at least two reception branches and a RAKE receiver to combine signal received by the different reception branches as well as a measuring receiver to make frequency specific measurements. The radio apparatus includes a switch connected with at least one reception branch and has at least two states in the first of which the switch is arranged to direct a signal received by a reception branch to the RAKE receiver and in the second of which the switch is arranged to direct a signal received by a reception branch to the measuring receiver. The radio apparatus makes measurements at other than the operating frequency without the reception at the operating frequency being interrupted. In a communications system the measurements may be associated with a handover.

17 Claims, 8 Drawing Sheets

U.S. PATENT DOCUMENTS

| | | | |
|---|---|---|---|
| 6,233,272 B1 * | 5/2001 | Yugawa | 375/148 |
| 6,233,456 B1 * | 5/2001 | Schiff et al. | 455/439 |
| 6,335,922 B1 * | 1/2002 | Tiedemann, Jr. et al. | 370/335 |
| 6,680,920 B1 * | 1/2004 | Wan | 370/311 |

FOREIGN PATENT DOCUMENTS

| | | |
|---|---|---|
| WO | WO 94/30025 | 12/1994 |
| WO | WO 97/09792 | 3/1997 |

* cited by examiner

MAKING MEASUREMENTS ON PARALLEL FREQUENCIES IN A RADIO COMMUNICATIONS DEVICE

This application is a 371 of PCT/FI98/00460, filed on May 29, 1998.

BACKGROUND OF THE INVENTION

1. Field of the Invention

The invention relates in general to measurements by means of which a radio apparatus attempts to find out the quantity and quality of radio-frequency oscillation in its operating environment. In particular the invention relates to measurements directed to frequencies other than that used for transmission and reception by a radio apparatus in a code division system during the measurements.

2. Brief Description of Related Developments

A communications link between a cellular radio system base station and terminal requires that the terminal transmits at a certain first frequency and receives at a certain second frequency which may be the same as said first frequency if the transmission and reception are otherwise separated by means of a duplexing method. Optimal link quality requires that the terminal selects a base station with a strong signal, and a frequency with as little noise and interference as possible.

Cellular radio systems applying code division multiple access (CDMA) have so far been mainly so-called single frequency networks (SFN) in which the whole system uses only one frequency band. This kind of an arrangement is used e.g. in the North-American IS-95 (Interim Standard 95) system. Frequency ranges used by other types of cellular radio systems are usually divided into several parallel frequency bands which can be called carrier wave frequencies or just frequencies in short. Proposals for future cellular radio systems have also put forward systems based on code division multiple access which have several frequency bands e.g. to separate hierarchically arranged cells from each other. This requires that a system be developed with which a receiver in such a system can carry out measurements not only at the frequency used, but also at other frequencies in order to find out how much there is other traffic and noise at the other frequencies.

A measurement means that the receiver in a terminal is tuned to the frequency measured and the required observations are made concerning the quantity and quality of the signal received, such as the mean power level at the frequency measured and its temporal distribution, for example. The receiver is tuned by changing the mixing frequency brought to a mixer in the receiver. When the receiver is tuned to the frequency measured it naturally cannot simultaneously receive a signal at the communications frequency used. So, the measurement of parallel frequencies cannot be carried out coincidentally with the reception of the desired signal at the communications frequency used.

It is known from patent document U.S. Pat. No. 5,101,501 some arrangements for realising a handover in a CDMA-type cellular radio system, applicable in single frequency networks. In an arrangement discussed by said document in conjunction with the description of the prior art, measurements are carried out not by the terminals but by the base stations. This arrangement requires that each base station has at all times free demodulating units that can be instructed to receive and measure a transmission by a terminal the signal of which in a neighbouring cell is weakening, thus indicating that the terminal is moving toward the inter-cell boundary. The transmission from the terminal is received, if necessary, by both base stations and the total responsibility for the connection is handed over to the new base station only when the terminal has clearly crossed the inter-cell boundary. In this method the base station equipment is continuously under-utilised since there has to be so many demodulating units that some of them are always free. Furthermore, the inter-base station signalling needed for the coordination of connections received via two routes puts a heavy load on the base station systems and their mutual communications connections.

Said patent document also discloses an improved arrangement in which the terminals measure a so-called pilot channel transmitted by the base stations. The implementation of the measurement is in practice rather simple as all base stations transmit at the same frequency. A terminal need not tune its receiver separately to other frequencies for measurement. It is obvious that this arrangement does not work if the different base stations transmit at different frequencies.

A known proposal for the arrangement of reception and measurement timing in a multifrequency CDMA system is a so-called compressed mode in which base station transmissions comprise successive frames in the normal manner but in which certain frames are transmitted at double speed so that half of the time reserved for such frames is left free for the measurements.

The proposed compressed mode involves several problems. The terminals have to be capable of receiving at a speed two times higher than the normal reception speed, which makes their structure and operation more complex. Compressing the frames means compromises in the implementation of control functions such as transmission power adjustment, which degrades the performance of the whole system. Pauses in the reception result in more complex continuous-operation algorithms, such as the measurement of propagation delay and channel estimation. Operation control for the compressed mode increases the signalling between the base stations and terminals.

In addition, the compressed mode is bound to cause deterioration of the bit error ratio, which is reflected in a decrease in the system performance.

An object of the present invention is to provide a method and equipment with which a terminal in a multifrequency, continuous-transmission radio communications system can make measurements not only at the operating frequency but also at other frequencies without the disadvantages characteristic of the prior art.

The objects of the invention are achieved by using in the terminal a diversity receiver and by switching one receiver branch at times to measurement use so that during measurement, the other branches of the receiver are receiving normally.

SUMMARY OF THE INVENTION

The radio apparatus according to the invention which comprises reception branches, a RAKE receiver including correlator branches, and a measuring receiver, is characterised in that it is arranged so as to tune a first reception branch to a different frequency than a second reception branch and to make measurements on both the signal generated by the first reception branch and the signal generated by the second reception branch.

The invention is also directed to a method for implementing the measurements. The method according to the invention is characterised in that in order to make measurements at other than the operating frequency, at least one reception branch is tuned to other than the operating frequency and the signal received by it is taken to a measuring receiver. A second embodiment of the method according to the invention is characterised in that in order to make measurements at other than the operating frequency, an impulse response measurement performed at the operating frequency by a measuring block in the RAKE receiver is interrupted and a measurement is carried out by the measuring block at other than the operating frequency.

The invention is further directed to a communications systems characterised in that at least one terminal in it is arranged so as to tune a first reception branch in the terminal to a different frequency than a second reception branch in the terminal and to make measurements on both the signal generated by the first reception branch and the signal generated by the second reception branch.

The diversity receiver as such is a known apparatus having at least two separate antennas and, related to them, at least two reception branches. Diversity reception is based on the fact that the reception characteristics of a radio apparatus depend to a large extent on the location, orientation and type of the receiving antenna. When a receiver has at least two antennas, the signals received through them can be combined, thus producing a better reception result than by either of the antennas alone. The antennas may be located in the receiver e.g. in such a manner that they receive at different polarisations so that in the optimal case the power level of the combined signal is about 3 to 4 decibels higher than the power level received through either of the antennas alone.

In the radio apparatus according to the invention, one branch of the diversity receiver includes a switch with which a signal received through that branch can be directed periodically to a measurement circuit. During measurement, the branch in question does not contribute to the combined signal, whereby the power level of the received signal decreases, which degrades the quality of the received, demodulated and decoded signal (in a digital receiver, the degradation of quality means that the bit error ratio of the received, demodulated and decoded signal increases). The phenomenon can be compensated for e.g. by requesting, by means of known signalling related to power level control, the base station to transmit at higher power during measurements. The base station may also automatically increase its power level for the duration of measurement periods if it can control the measurement timing used by the terminals or deduce it from the control messages it has sent. If the base station uses transmission interleaving the period of which is longer than a measurement period in the terminal, the interleaving, too, can be used to compensate for the bit error ratio fluctuation caused by the measurements.

In accordance with the invention, a terminal applying code division multiple access can make measurements at other frequencies than the reception frequency in use without having to interrupt its other operation. The RF parts of the terminal are well utilised and the invention hardly adds to the complexity of the terminal.

BRIEF DESCRIPTION OF THE DRAWINGS

The invention is described in more detail with reference to the preferred embodiments presented by way of example and to the accompanying drawing wherein.

Like elements in the Figures are denoted by like reference designators.

DETAILED DESCRIPTION OF THE PREFERRED EMBODIMENT(s)

Figure 1A:
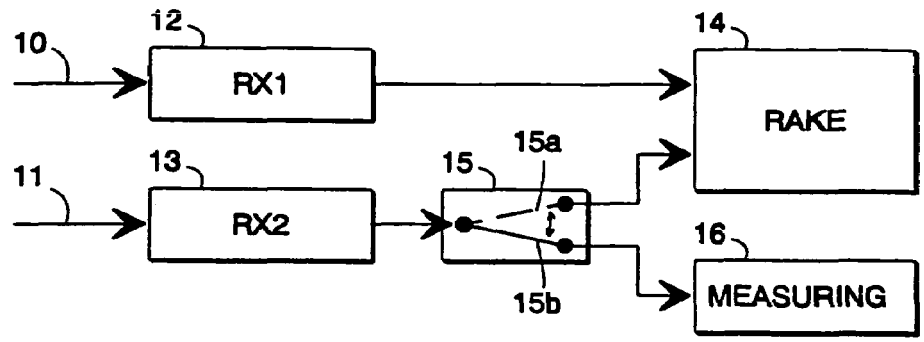
FIG. 1a illustrates the principle of the invention.

In FIG. 1a line 10 represents a signal coming from a first antenna (not shown) of a diversity receiver, and line 11 represents a signal coming from a second antenna (not shown) of the diversity receiver. Parallel RF and IF blocks 12 and 13 comprise the necessary elements for filtering, amplifying and converting the incoming RF signal into a baseband signal. Block 14 is a known RAKE receiver which combines the arriving nonsimultaneous, out-of-phase signals in a manner that produces a combined signal power as high as possible. A switch 15 has two positions. In the position 15a depicted by a dashed line the switch 15 couples the signal produced by the RF and IF block 13 to the RAKE receiver's 14 second input which is similar to the input to which the signal produced by the RF and IF block 12 is coupled directly. In the position 15b depicted as a continuous line the switch 15 couples the signal produced by the RF and IF block 13 to a measuring receiver 16 which measures the power level of the signal brought to it as well as the temporal distribution of power and, if necessary, other factors that the terminal needs to know in order to be able to make the decision on frequency selection. Measuring receivers as such are known from prior-art devices that use e.g. the compressed mode to make measurements.

For simplicity, FIG. 1a does not show the path of the signal from the RAKE receiver 14 and measuring receiver 16 on, but it is obvious to a person skilled in the art that after the receiver the signal can be taken to many kinds of circuits and devices for further processing. If the received signal is a representation of speech, as in a telephone, it is converted to acoustic form by means of a loudspeaker and appropriate peripheral circuits. If the signal comprises data, it can be taken to a computer processor for processing or to a memory device for storage. The invention does not specify the nature or amount of information transferred via the communications connection, nor its use after reception.

Figure 1B:
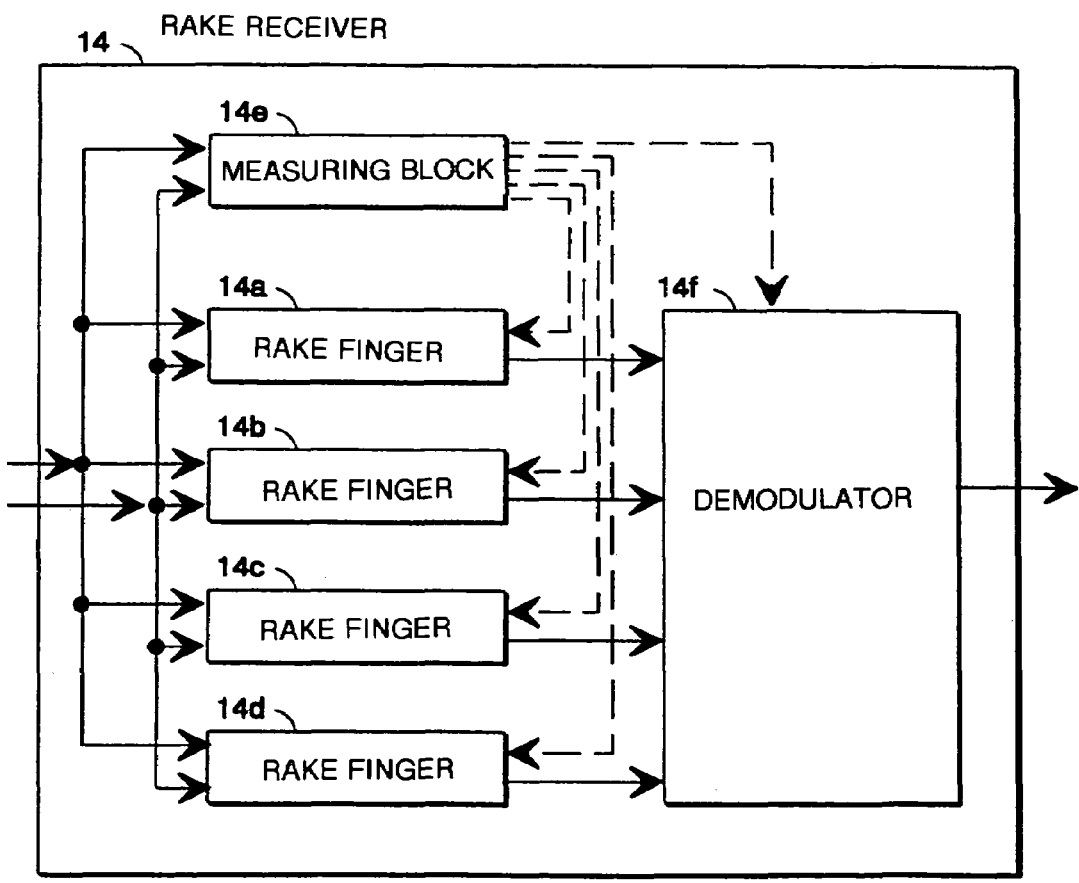
FIG. 1b shows a detail of FIG. 1a,
FIG. 2 shows a diversity receiver in a radio apparatus according to the invention.

FIG. 1b shows in more detail the structure of the RAKE receiver 14. Parallel blocks 14a, 14b, 14c and 14d are so-called RAKE fingers, or correlator branches, which are synchronised to received signal components. Block 14e is a measuring block for measuring the impulse response of the received signal, the measurement results of which are used for controlling the operation of the correlator branches 14a to 14d. The signals produced by the different correlator branches are combined and demodulated in block 14f from which the combined signal is taken to the other parts of the radio apparatus. In the arrangement according to the invention, the measuring block 14e measures the impulse response from both (all, if there are more than two antennas) branches of the diversity receiver and synchronises the correlator branches 14*a* to 14*d* to the signal components with the highest received power levels e.g. in the order according to the measured impulse response strength. The measuring block 14*e* and correlator branches 14*a* to 14*d* include a logic switch or other switch arrangement which is not shown in FIG. 1*b* and with which the measuring block 14*e* and each correlator branch 14*a* can be coupled to receive the signal produced by either of the branches of the diversity receiver. After correlation, the received signal components are combined in block 14*f* regardless of the diversity branch through which a particular signal component was received. When a switch 15 according to FIG. 1*a* directs signals received by a second branch of the diversity receiver to measurement, only signal components received by the first branch of the diversity receiver are directed to the correlator branches 14*a* to 14*d* in the RAKE receiver 14.

A broadband signal at the measured frequency is brought to the measuring receiver during the measurement. The measuring receiver knows the spreading codes used by the base stations measured and uses them to calculate the strength and quality of the measured signal in a known manner either by correlating the code with the received signal or by using a matched filter. The operation of the measuring receiver 16 resembles the operation of the measuring block 14*e* of the RAKE receiver 14. Indeed, in an embodiment of the invention, the measuring receiver of the RAKE receiver can be used to carry out the measurements at other frequencies, instead of using a separate measuring receiver. Then the measurement of the impulse response at the frequency in use naturally has to be interrupted for the duration of the measurements at other frequencies. By means of a switch arrangement (not shown) in the measuring block the measuring block is coupled so as to receive a signal produced by that branch of the diversity receiver which is tuned to the frequency measured, and by means of switch arrangements (not shown) in the correlator branches the correlator branches are coupled so as to receive only the signal produced by that branch of the diversity receiver which stays tuned to the frequency in use.

Figure 2:
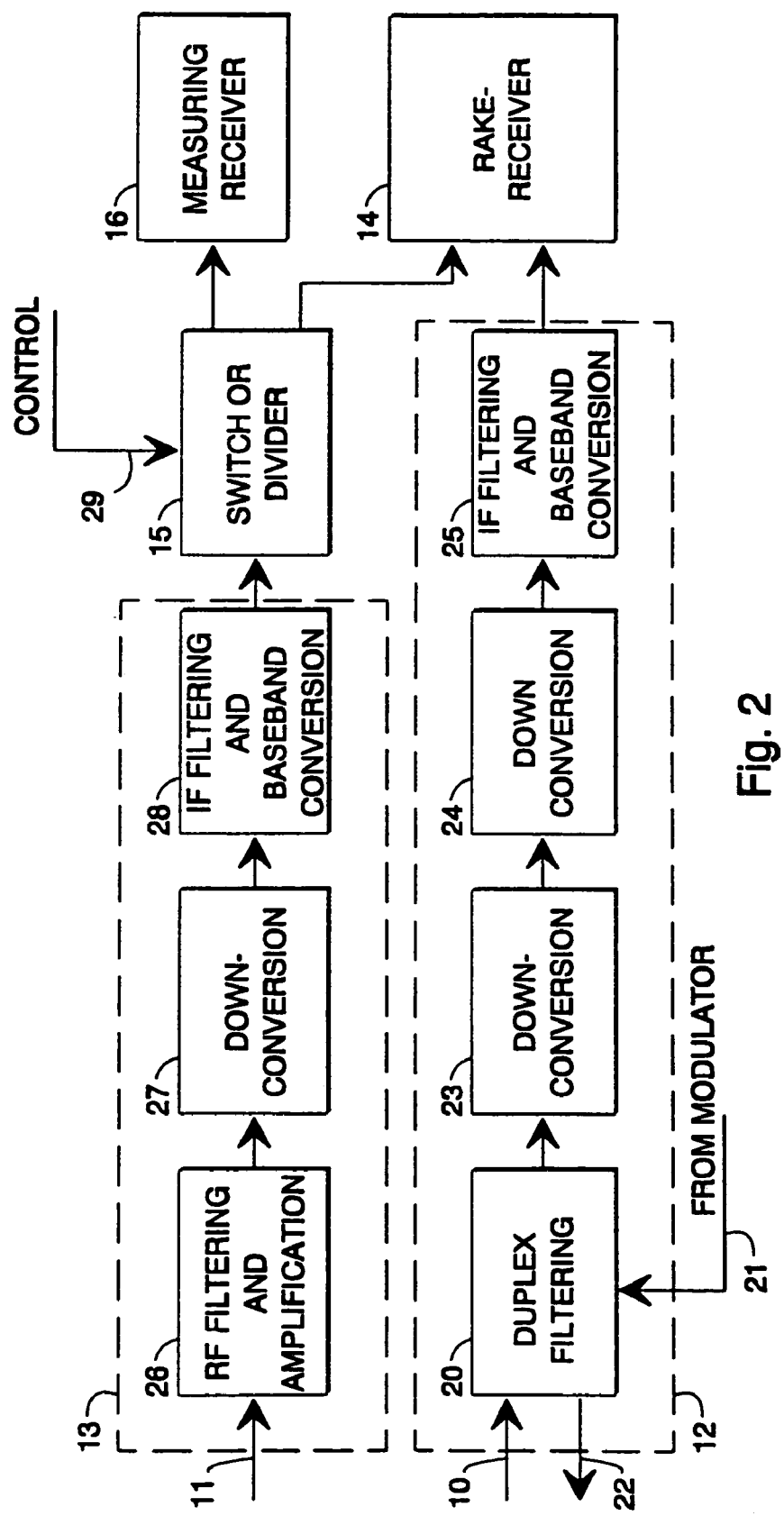

FIG. 2 shows a more detailed implementation to realise the principle according to FIG. 1*a*. Lines 10 and 11 represent signals coming from a first and second antenna (not shown). A RF and IF block 12 includes a duplex filter 20 having an input line 21 from the transmitter modulator (not shown) of the radio apparatus and an output line 22 to the first antenna of the radio apparatus for transmitting radio signals. In practice, the signals represented by lines 10 and 22 travel through a common micro-strip conductor and/or coaxial cable between the duplex filter 20 and the first antenna of the radio apparatus. The duplex filter 20 directs the transmitted and received signals in such a manner that the transmission-frequency signal from the modulator is taken to the antenna and the reception-frequency signal from the antenna is taken to a filter and amplifier block 23. The filtered and amplified signal is taken to a down-conversion block 24 where it is converted to an intermediate frequency (IF) and further to an IF filtering and baseband conversion block 25 where the IF signal is filtered and converted to baseband. The resulting signal is taken to a first input of the RAKE receiver 14. The entity comprising blocks 20, 23, 24 and 25 can be called a first reception branch of the diversity receiver of the radio apparatus.

In FIG. 2, a RF and IF block 13 comprises a filter and amplifier block 26, down-conversion block 27 and an IF filtering and baseband conversion block 28, which are similar to the aforementioned blocks 23, 24 and 25. A signal represented by line 11 is taken through the blocks 26, 27 and 28 in this order. A switch or divider block 15 after block 28 comprises an electrically-controlled switch or divider (not shown) which may be e.g. a known semiconductor switch. A control signal brought to block 15 via a control line 29 determines whether the signal produced by a second reception branch comprising blocks 26, 27 and 28 is taken from block 15 to a second input of the RAKE receiver 14 or to a measuring receiver 16.

Figure 3:
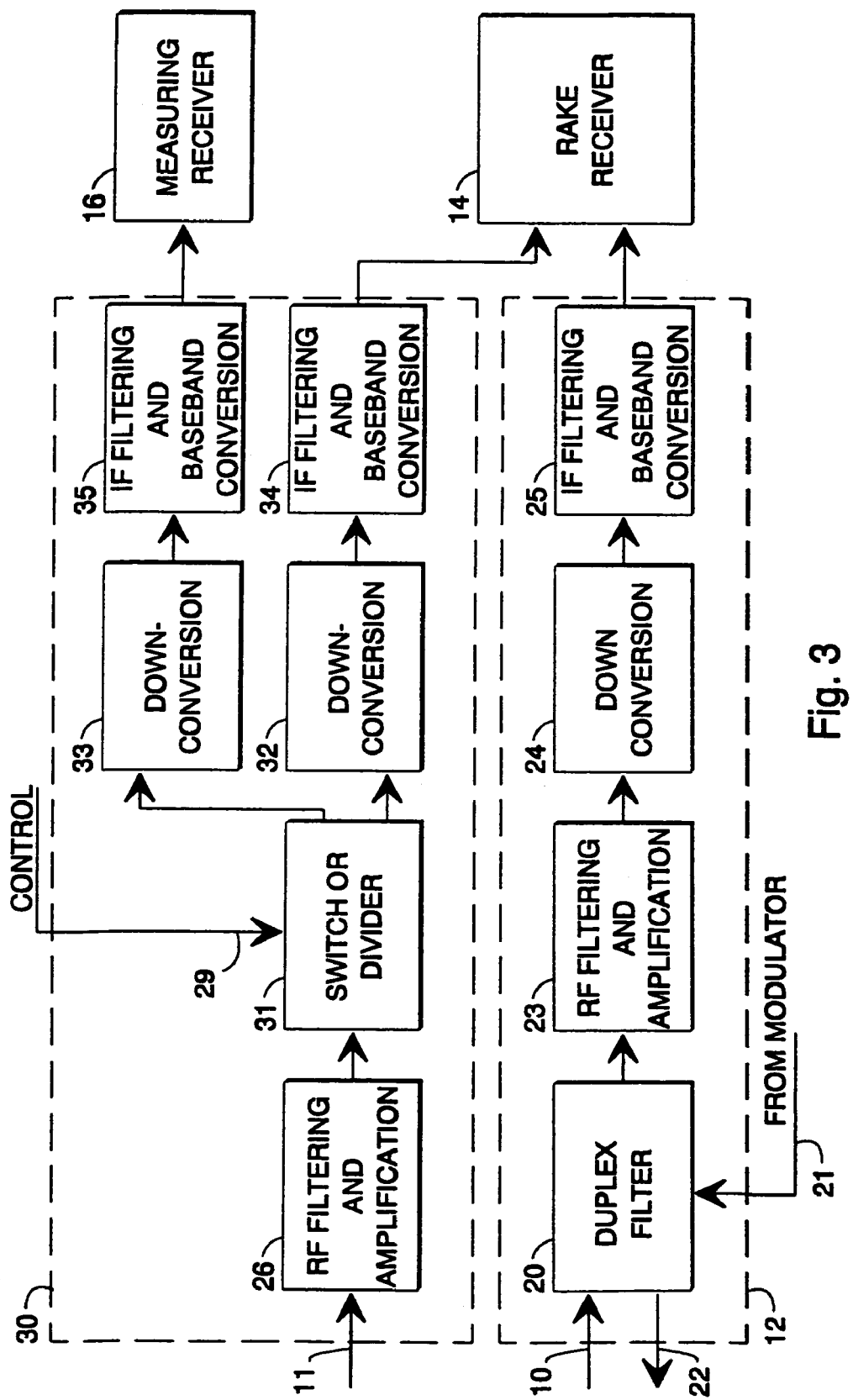
FIG. 3 shows a variation of the structure shown in FIG. 2.

The switch that directs the signal produced by the second reception branch either to the reception or to the measurement need not be located just before the RAKE receiver. FIG. 3 shows a variation of the implementation shown in FIG. 2. The first branch of the receiver is similar to that of FIG. 2, but the RF and IF block 30 of the second branch comprises a RF switch 31 located between a filter and amplifier block 26 and two parallel down-conversion blocks 32 and 33. A control signal brought to the switch 31 via a control line 29 determines whether the signal filtered and amplified in block 26 is taken to block 32 or to block 33. A signal taken to block 32 is IF converted and taken further via an IF filtering and baseband conversion block 34 to the RAKE receiver 14, but a signal taken to block 33 is IF converted and taken via an IF filtering and baseband conversion block 35 to a measuring receiver 16.

In the embodiment of FIG. 3, two parallel and mutually independent IF conversion blocks make it possible to change very rapidly the operation of the second reception branch from the operating frequency to the frequency measured and vice versa. The first IF conversion block 32 may stay tuned to the operating frequency all the time and the second IF conversion block 33 may be tuned in advance to the frequency measured so that in the beginning and end of the measurement there is no need to use time for tuning the IF conversion as in the embodiment shown in FIG. 2.

In FIGS. 2 and 3, coupling to the measuring receiver is arranged from the branch of the diversity receiver that has no duplex filter. This is advantageous because then there is no need to concern about the changing of the duplex interval, or the frequency difference between the transmission and reception frequencies during measurements.

Figure 4:
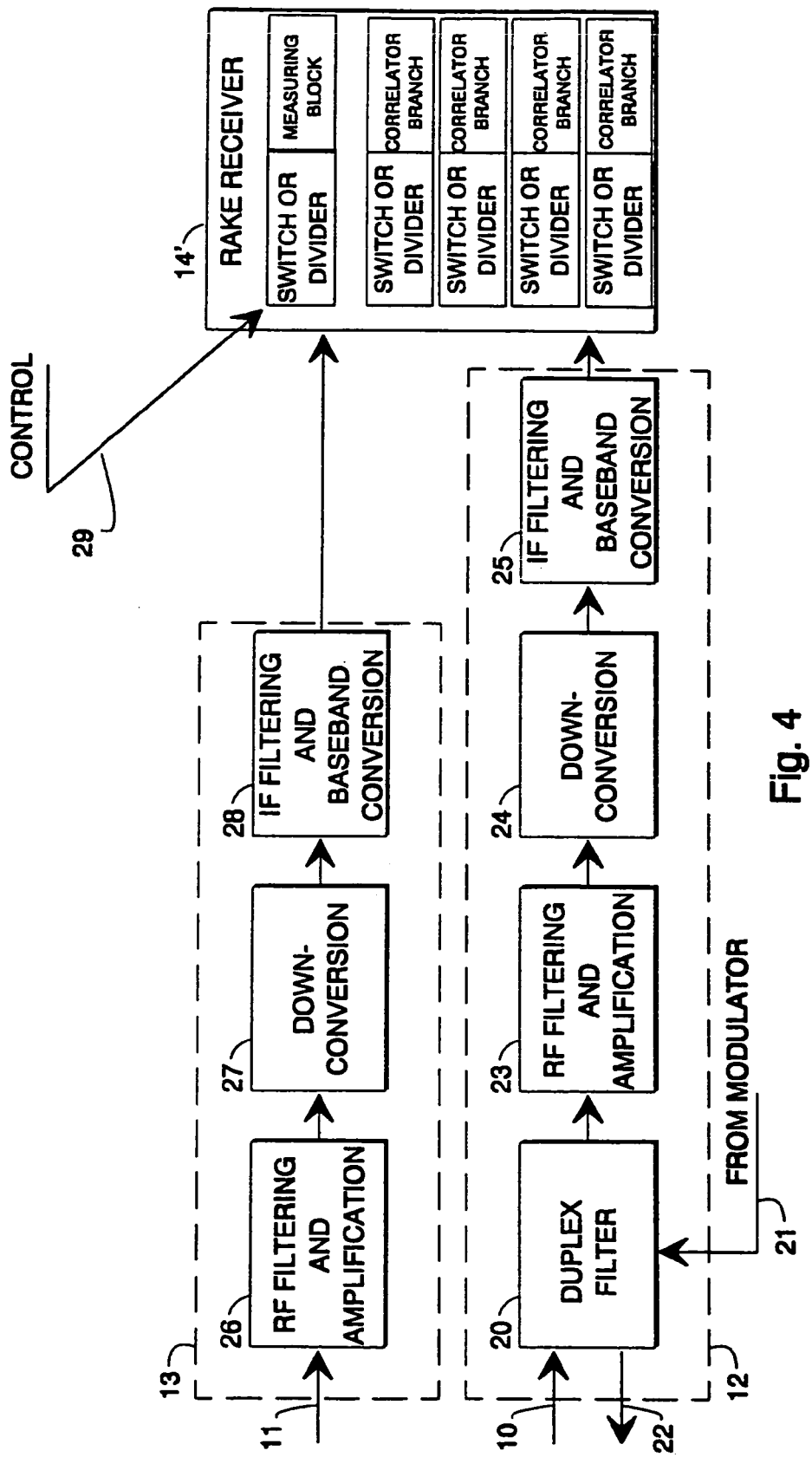
FIG. 4 shows a second variation of the structure shown in FIG. 2,
FIGS. 5a and 5b show alternative arrangements for producing mixing frequencies.

FIG. 4 shows an embodiment of the structure according to the invention wherein both branches 12 and 13 of the diversity receiver are in continuous connection with a RAKE receiver 14' and wherein a control line 29 couples by means of switch means in the measuring block of the RAKE receiver 14' the measuring block so as to measure a signal generated by one or the other of the diversity branches. When the measurement is directed to other than the operating frequency, the switches in the RAKE receiver's correlator branches direct to the correlator branches only the signal produced by the lower diversity branch 12; the upper diversity branch 13 is tuned to the frequency measured and the signal produced by the upper diversity branch 13 is taken to the RAKE receiver's measuring block by means of switch means included in it.

Figure 5A:
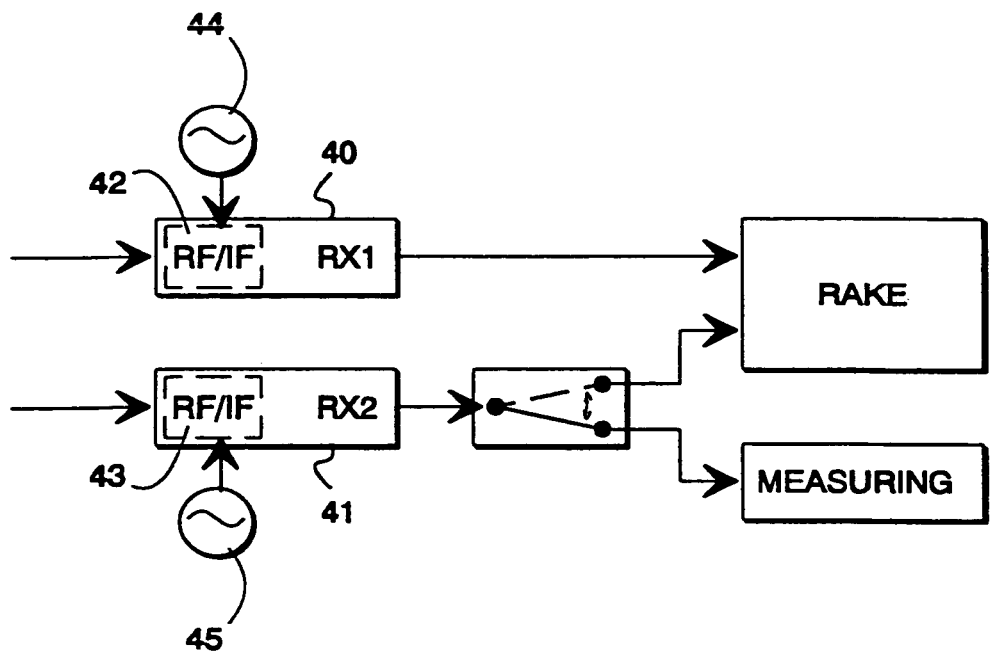
Figure 5B:
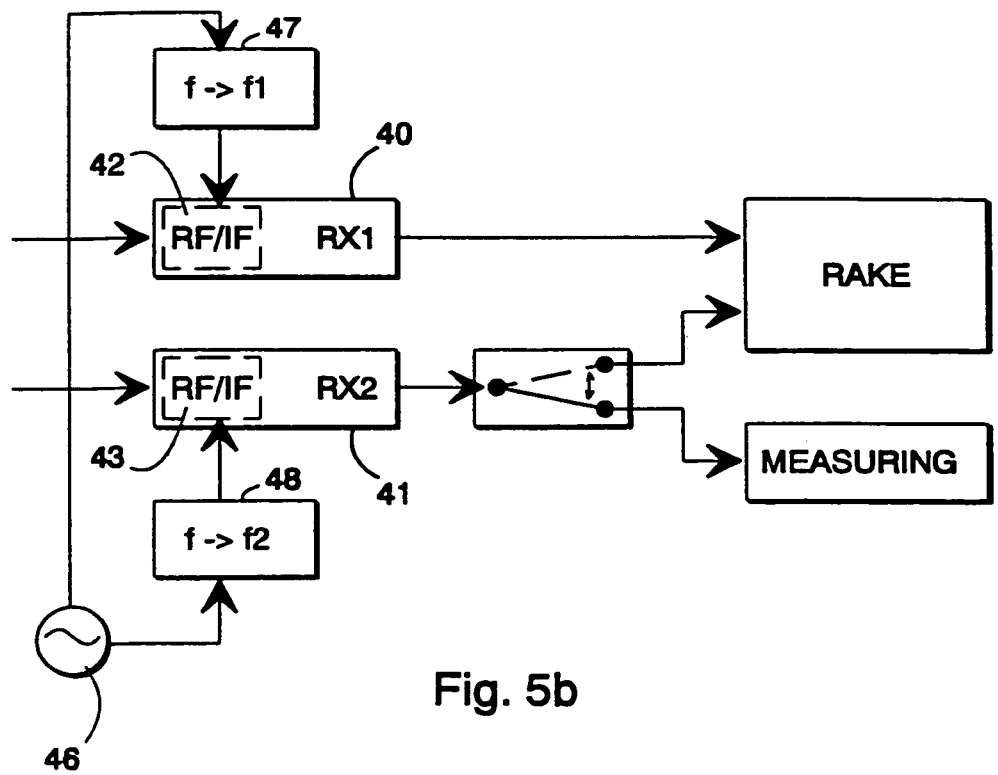

The IF conversion requires that the received signal be mixed with a desired mixing-frequency signal. FIGS. 5*a* and 5*b* show two alternative principles for producing the required mixing frequencies. Each of the IF conversion blocks 42 and 43 included in the reception branches 40 and 41 of the diversity receiver may have its own electrically controlled oscillator 44 and 45 in accordance with FIG. 5*a* or a mixing frequency signal of a desired frequency may be brought to the IF conversions blocks 42 and 43 from a common oscillator 46 via suitable electrically regulated frequency conversion circuits 47 and 48 in accordance with FIG. 5*b*. Generation of several desired frequencies from a common oscillator is known e.g. from the Finnish patent application FI 964559 which has the same applicant as this patent application. Furthermore, the generation of a suitable mixing frequency is known from all radio apparatuses that are tuned by changing the mixing frequency.

Figure 6:
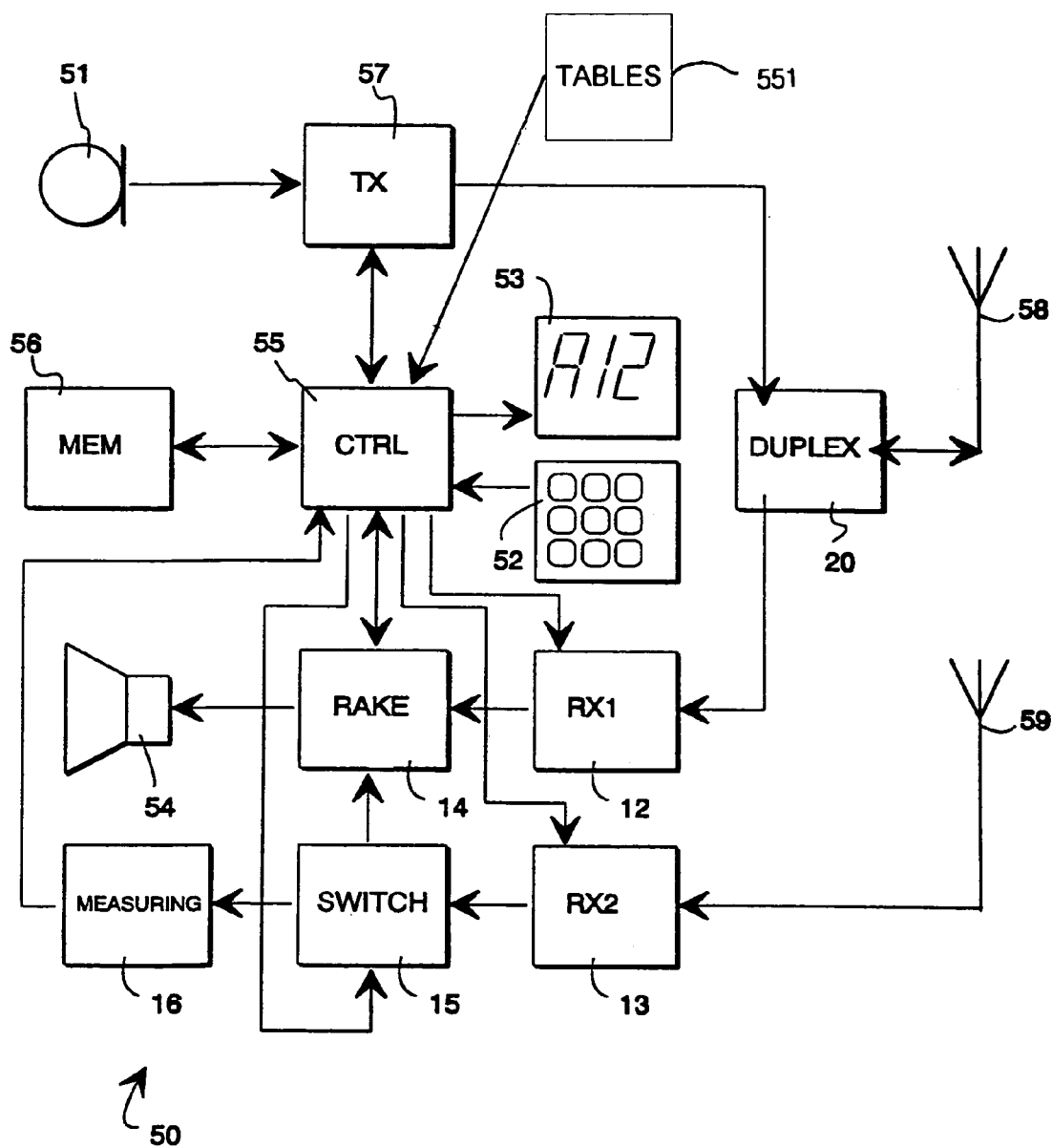
FIG. 6 shows the locations of parts of the diversity receiver according to FIG. 2 or 3 in a terminal of a cellular radio system.

FIG. 6 schematically shows a mobile phone 50, which is a typical cellular radio system terminal. It comprises parts typical of prior-art mobile communications devices, such as a microphone 51, keypad 52, display 53, earphone 54, and a control block 55 that controls the operation of the terminal. The control block 55 can be typically realised using a microcontroller unit (MCU) or digital signal processor (DSP) which has access to a memory 56. In addition, FIG. 6 shows a transmission block 57 which comprises speech encoding, channel encoding, scrambling and modulation as well as the transmission RF functions. A duplex filter 20, first antenna 58, second antenna 59, RF and IF block 12 in a first transmission branch, RF and IF block 13 in a second transmission branch, RAKE receiver 14, switch 15 and a measuring receiver 16 are located with respect to each other as in the above-described embodiment illustrated by FIG. 2. FIG. 6 assumes that the RAKE receiver 14 comprises in addition to the combining of signals coming from blocks 12 and 15, also the demodulation, descrambling, channel decoding and speech decoding for the combined signal so that the signal produced by the RAKE receiver 14 can be taken directly to the earphone 54. The control block 55 controls the tuning of the RF and IF blocks 12 and 13 as well as the operation of the switch 15 and the RAKE receiver 14. It receives measuring data from a measuring amplifier 16. In addition, the control block 55 controls the user interface of the mobile phone 50.

Figure 7:
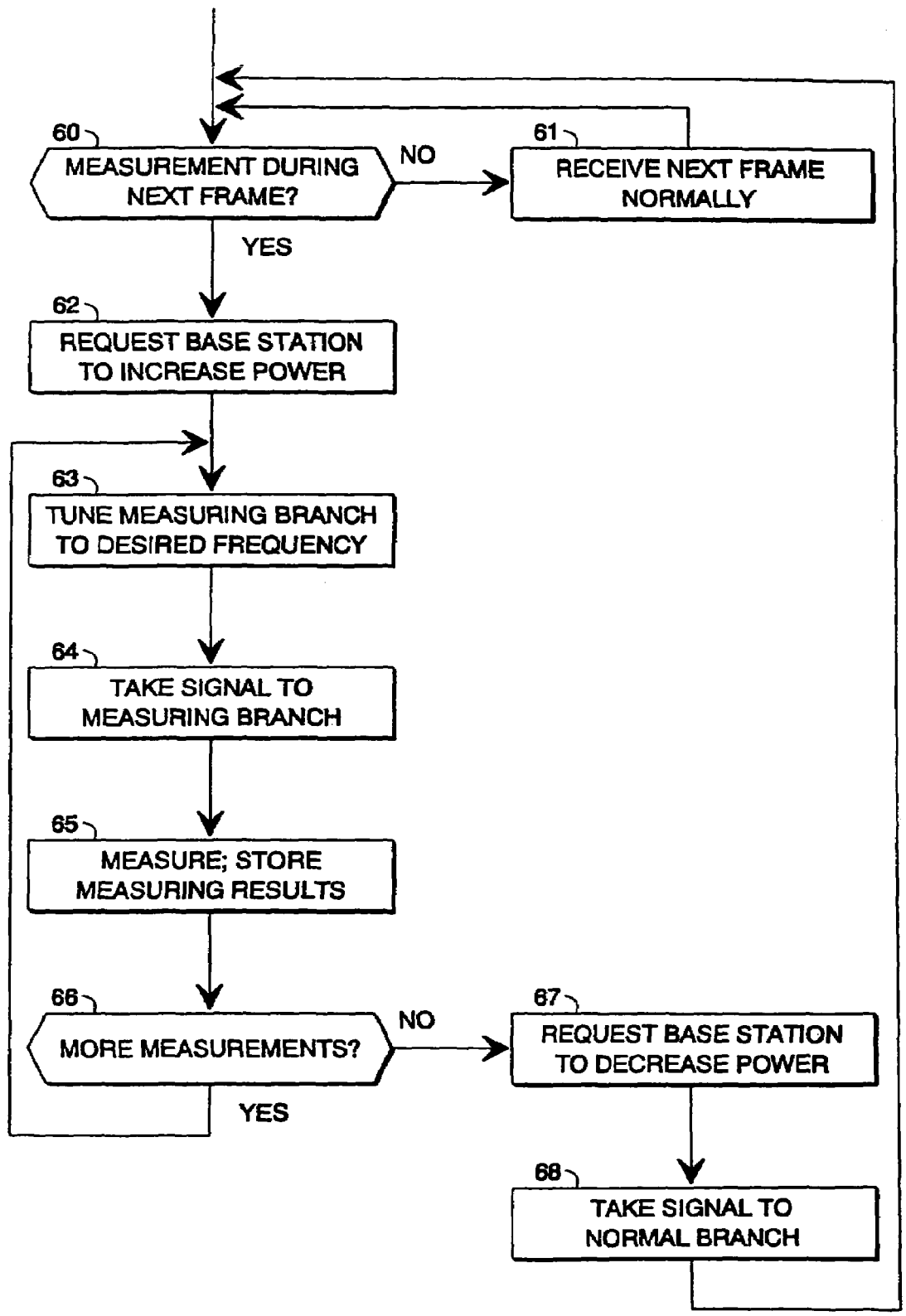
FIG. 7 shows an embodiment of the method according to the invention.

Below it will be discussed the implementation of the method according to the invention in a cellular radio system terminal with reference to a preferred embodiment illustrated in the form of a flow diagram in FIG. 7. Measurement activity according to the flow diagram can be commenced in any other stage of the operation of the cellular radio system in which it is receiving in the normal manner through at least two diversity reception branches a transmission sent by a base station. Therefore, FIG. 7 does not specify the state from which the downward-pointing arrow coming to state 60 originates. In state 60 the terminal decides whether it is going to make measurements at other than the operating frequency during the next frame. Here it is assumed that the measurements are timed in frames; various timing alternatives are discussed in more detail later on. If the terminal decides not to make measurements during the next frame, it receives the next frame normally in state 61 and returns to state 60. If the decision in state 60 is yes, the terminal moves from state 60 to state 62.

Taking one diversity reception branch from normal reception use to measurement use decreases the power level of the combined signal produced by the terminal's RAKE receiver by about 3 to 4 dB. To keep the bit error ratio of the received signal from deteriorating the terminal requests in state 62 the base station to transmit the next frame at a transmission power higher than the usual. It is known from the prior art several methods to control the transmission power in a cellular radio system such that it is high enough to facilitate reasonably error-free reception, but at the same time as low as possible to prevent unnecessary use of power and to keep the general radio noise level from increasing too much. Controlling the transmission power generally requires certain power control (PC) signalling between the terminals and base stations, so the request made in state 62 in FIG. 7 can be realised by means of known PC signalling and thus it does not increase the total amount of signalling needed in the system.

A method for controlling transmission power, in which method the receiving device transmits to the transmitting device requests for increasing or decreasing the transmission power, is generally known as closed-loop power control. Every closed-loop power control scheme involves a delay between the moment when the need for changing the transmission power is perceived at the receiving device and the moment when the first transmission with the changed transmission power arrives from the transmitting device to the receiving device. The delay arises from signal processing at the receiving device, waiting for a suitable moment to transmit the request for changing power, propagation delay between the receiving device and the transmitting device, signal processing at the transmitting device, waiting for the moment of next transmission to the particular receiving device that requested for the power change, and propagation delay between the transmitting device and the receiving device. In a cellular radio system it is possible to estimate the length of the delay at any given moment. In fact, delay estimates are commonly used in the terminals and/or base stations of a cellular radio system to compensate for the momentary value of propagation delay between the base station and the terminal, which value depends on the mutual distance therebetween and the possible effect of multipath porpagation.

The delay estimate may be advantageously used together with the invention so that when the terminal knows that it will shortly take one diversity reception branch from normal reception use to measurement use, it starts transmitting to the base station requests for an increase in the transmission power not later than one delay length before the start of the measurement. In an ideal situation the terminal transmits the request for an increase in the transmission power so that the first transmission transmitted with at an increased power level arrives at the terminal simultaneously with the beginning of the measurement. This way the higher transmission power and the resulting prevention of bit error ratio from increasing will be available already when the measurement begins. Similary when the terminal knows that it will shortly restitute the diversity reception branch from measurement use to normal reception use, it will start sending the requests for decreasing transmission power to the base station about one delay length beforehand. This way the base station avoids transmitting with an unnecessarily high power level for a short period around the end of the measurement, which is advantageous when the system interference level is considered.

In state 63 the terminal tunes the IF converter in the diversity reception branch used for measurements in such a manner that the measurement can be directed to the desired frequency. In state 64 the terminal sets a special switch (reference designator 15 in FIGS. 1, 2 and 4, reference designator 31 in FIG. 3) in a position in which it takes the received signal to a measuring receiver. The measurement proper and the saving of the results in the terminal's memory take place in state 65. In state 66 the terminal decides whether it will continue measuring or whether it will return during the next received frame to normal reception. If the terminal decides to continue measuring, it returns to state 63 representing the tuning of the measuring branch. Otherwise the terminal requests in state 67 the base station to reset the transmission power back to normal and sets in state 68 the aforementioned switch in a position in which it takes the received signal to the RAKE receiver and returns to state 60.

One measurement may last several frames, one whole frame or part of a frame. Timing can be based on a timetable 551 used commonly in the system or each terminal can independently decide on the timing of the measurements it makes. If a measurement lasts only part of a frame at a time, with the length of said part of a frame being considerably shorter than the interleaving length used by the base station, the decrease of power level caused by the measurement in the terminal's RAKE receiver does not necessarily call for an increase in the transmission power of the base station because with the interleaved signal it is possible to correct the bit errors caused by the decrease in the power level. Separate requests for increasing and decreasing the base station transmission level are unnecessary if the measurements are performed exactly according to a certain timetable agreed upon in advance or signaled by the base station to the terminals each time. Namely, if the measurement timetable 551 is known to the base station, it can increase and decrease the transmission power without separate requests from terminals. Timetables for the different terminals or groups of terminals are advantageously different so that the drop in the system performance is distributed evenly on the time axis and will not result in concentrated noise peaks. The length of measuring periods may also vary according to whether the terminal is in the middle of a handover or has just performed a handover. When the terminal has not yet performed a handover, it may be preferable that it makes short "monitoring measurements" to mainly examine the signal strength in possible new cells. As a handover is being performed or has just been performed, it is preferable for the terminal to carry out a longer measurement in which it may receive control information such as the broadcast control channel (BCCH) from the new base station.

An advantageous further embodiment of the method according to the invention is a method where each terminal may adaptively change the rate at which it makes measurements. Previously it was stated that the invention makes it possible for each terminal to independently decide on the timing of the measurements it makes. Adaptive changing the rate of measurements means that if the terminal has not detected any other carriers during a completed inter-frequency measurement, it may reduce the rate of inter-frequency measurements to a relatively low value like 1 Hz or lower. On the other hand, if the terminal detects other carriers, it may keep the current rate of measurements or even increase it to a relatively high value like 20 Hz or higher. Also, it is advantageous to increase the rate of inter-frequency measurements when the relative received power (proportional to the perch/synchronization channel of the serving base station) from some or several other carriers increases. The stronger the other carriers, the more often should measurements be done because inter-frequency handovers are more likely to take place.

Any timing, adaptive or not, may be applied separately to different carriers, i.e. each carrier that could be measured may have its own measurement rate.

Next it will be discussed a communications system according to the invention with reference to a preferred embodiment illustrated in FIG. 8. The communications system 70 comprises in this case base stations (BS) 71 which are intended for mobile outdoor terminals and the coverage areas, or cells, or which are relatively large; the cell diameter is typically from a few hundred meters to a few kilometers. In addition, the communications system comprises local base stations (LBS) 72 which are located e.g. in office buildings and the coverage areas of which cover a room, a few rooms or a whole office. Operation of local base stations is controlled by a local base station controller (LBSC) 73 which in turn, operates under a base station controller (BSC) 74, like the base stations 71. The base station controller 74 is connected with a mobile services switching centre (MSC) 75 which can have several base station controllers under it and which may be further connected to other communications networks such as a public switched telephone network (PSTN). The terminals 76 are in radio connection with either the base stations 71 or local base stations 72, depending on the location of a particular terminal with respect to the base stations and on other factors affecting base station selection, which as such are of no importance as far as this invention is concerned.

Figure 8:
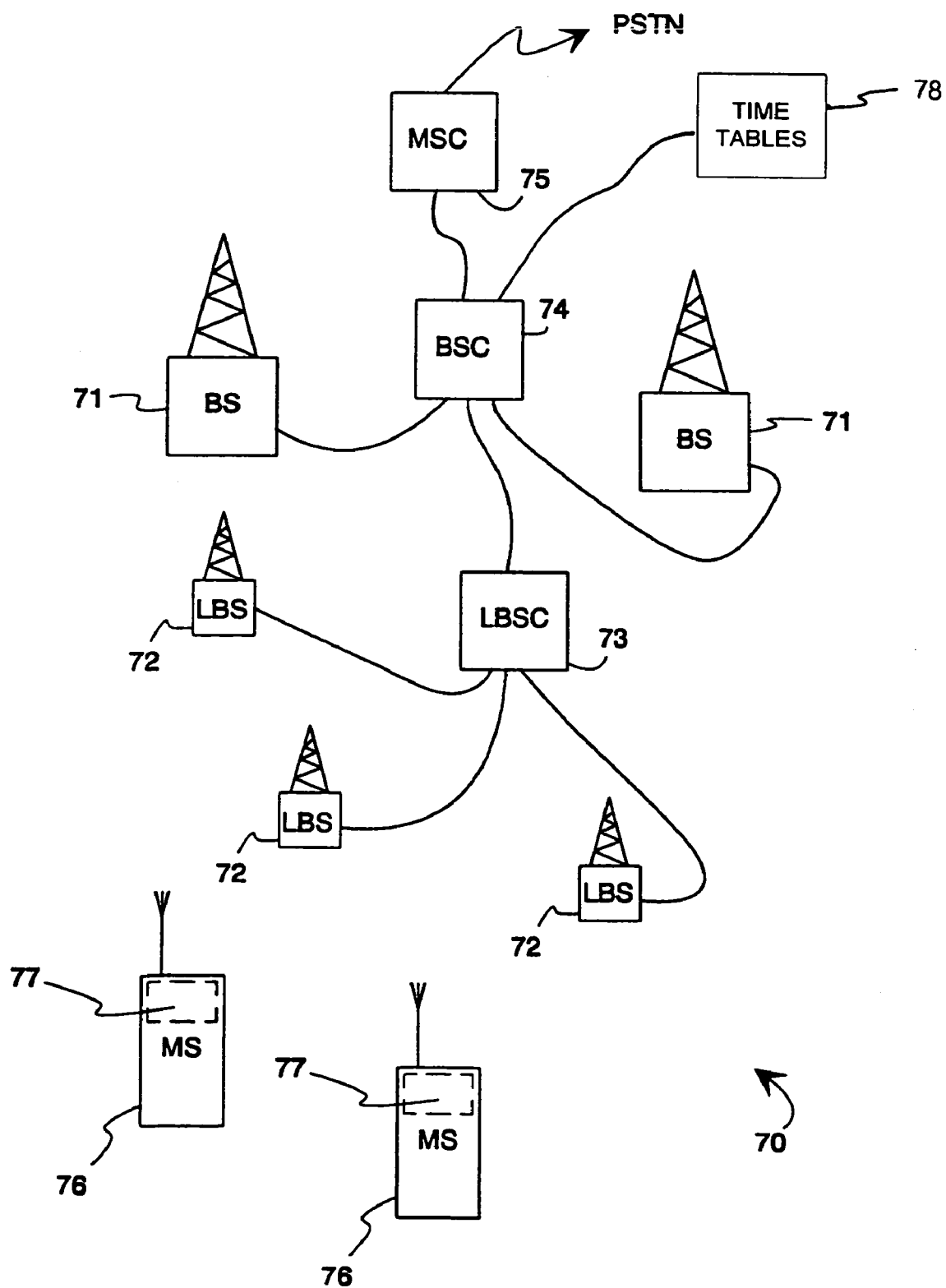
FIG. 8 shows a communications system according to the invention.

In the system according to FIG. 8, local base stations 72 can operate at a different frequency than the base stations 71. Then a terminal which is in radio connection with a base station 71 can in the manner according to the invention regularly measure the signal of the nearest local base station 72. Due to the smaller coverage area of the local base stations and more stable indoor propagation conditions the local base stations 72 can generally offer to the terminals 76 a higher transmission rate or otherwise better service level so that it is advantageous for the terminals to try to switch from base station 71 cells to local base station 72 cells. To make measurements in the manner according to the invention the terminals 76 have a diversity receiver 77 according to the invention the details of which were described earlier in this document. It should be noted that the invention does not require that all terminals of the communications system 70 include a diversity receiver according to the invention. In addition to the operating frequency, simpler terminals can make measurements also at other frequencies e.g. by skipping a frame once in a while and using that time to make measurements. So, the invention does not exclude the use of old terminals, for example, which is a great benefit since the introduction of the system according to the invention might otherwise suffer from the unwillingness of users to purchase new terminals.

The base station controller 74 can control the operation of base stations and local base stations e.g. in such a manner that it lets each base station or local base station know what other frequencies are probably receivable within the coverage area of each particular base station or local base station. The base stations and local base stations can forward this information to the terminals so that these can direct their measurements on the appropriate frequencies. If the system employs precise timetables 78 for the measurements by terminals, the base station controller 74 can coordinate those timetables 78, e.g. such that in overlapping cells the measurements are made simultaneously so that the increase in the transmission power possibly required by the measurements is realized simultaneously in the base stations of the overlapping cells and the overall disturbance in the operation of the system remains as small as possible.

It is obvious to a person skilled in the art that the preferred embodiments described above are exemplary only and do not limit the invention. For example, above it was discussed only diversity receivers having two reception branches. A diversity receiver can be easily constructed that has more reception branches, of which at least one comprises a switch by means of which the signal received by that branch can be directed to measurement instead of normal reception.

What is claimed is:

1. A radio apparatus (50) comprising a diversity receiver which has a first reception branch (12; 40) and a second reception branch (13; 41), a RAKE receiver (14) comprising correlator branches (14a, 14b, 14c, 14d) for combining received signal components on baseband frequency, a measuring receiver (14e; 16) for making measurements, characterized in that the radio apparatus is arranged so as to tune the first reception branch (12; 40) to a different frequency than the second reception branch (13; 41) and to make measurements of a signal produced by one reception branch simultaneously with the reception of a signal produced by the other reception branch, and a reception branch having a switch (15; 31) which has at least two states (15a, 15b), in the first state the switch is arranged so as to direct the signal received by said reception branch having the switch to said RAKE receiver (14), and in the second state switch is arranged so as to direct the signal received by said reception branch having the switch to said measuring receiver (14e; 16).

2. The radio apparatus of claim 1, characterized in that said reception branch having the switch comprises, successively in the direction of the flow of the received signal:

an RF filter and amplifier (26),
a first mixer (27) for IF conversion,
an IF filter, and
a second mixer (28) for baseband conversion,
so that said switch (15) is located after said second mixer in the direction of the flow of the received signal.

3. The radio apparatus of claim 1, characterized in that said reception branch having the switch comprises:

an RF filter and amplifier (26),
a first mixer (32) for IF conversion,
a first IF filter (34),
a second mixer (34) for baseband conversion,
a third mixer (33) for IF conversion,
a second IF filter (35), and
a fourth mixer (35) for baseband conversion,
so that said switch (31) is located between said RF filter and amplifier (26) on the one hand and said first mixer (32) and third mixer (33) on the other, and it is arranged so as to in the first state to conduct a signal from said RF filter and amplifier (26) via said first mixer (32), said first IF filter (34) and said second mixer (34) to said RAKE receiver (14) and in the second state to conduct a signal from said RF filter and amplifier (26) via said third mixer (33), said second IF filter (35) and said fourth mixer (35) to said measuring receiver (16).

4. The radio apparatus of claim 1, characterized in that the radio apparatus comprises an oscillator (44, 45) for the first reception branch and the second reception branch (40, 41) to produce an IF mixing frequency needed for the tuning of the reception branch.

5. The radio apparatus of claim 1, characterized in that the radio apparatus comprises a common oscillator (46) to produce IF mixing frequencies needed for tuning all the reception branches as well as frequency conversion means (47, 48) to convert in each reception branch the frequency produced by said common oscillator to an IF mixing frequency suitable for said tuning.

6. The radio apparatus of claim 1, characterized in that said RAKE receiver comprises a measuring block (14e) for measuring the impulse response of received signals, and said measuring block can be repeatedly set so as to measure alternatively the signal produced by the first reception branch or the signal produced by the second reception branch.

7. A method for making frequency specific measurements in a diversity receiver operative with at least two reception branches and which receives at an operating frequency, the method comprising:

directing signals of respective ones of the reception branches at the operating frequency to the diversity receiver;

for making a measurement at other than the operating frequency, tuning at least one reception branch to other than the operating frequency; and redirecting the signal received by the at least one reception branch to a measuring receiver, wherein the tuning of at least one branch of the diversity receiver to other than the operating frequency is timed according to a certain predetermined timetable which is known to a transmitter apparatus transmitting at the operating frequency.

8. The method of claim 7, characterized in that the transmitter apparatus transmitting at the operating frequency is also requested (62) to transmit at a higher power during the time that said at least one branch of the diversity receiver is tuned to other than the operating frequency.

9. The method of claim 8, characterized in that a request for said transmitting at a said higher power is transmitted to said transmitter apparatus at a moment of time which is earlier by a certain delay length than the commencement of making the measurements at other than the operating frequency, said delay length corresponding to the previously estimated delay between a transmitted request for changing transmission power and the arrival at the receiver of the first transmission with the transmission power changed as per the request.

10. The method of claim 8, characterized in that a request for transmitting at a lower power is transmitted to said transmitter apparatus at a moment of time which is earlier by a certain delay length than the end of making the measurements at other than the operating frequency, said delay length corresponding to the previously estimated delay between a transmitted request for changing transmission power and the arrival at the receiver of the first transmission with the transmission power changed as per the request.

11. The method of claim 7, characterized in that said transmitter apparatus has various timetables concerning various terminals or groups of terminals.

12. The method of claim 7, characterized in that bit errors that occur in the reception while at least one branch of the diversity receiver is tuned to other than the operating frequency are corrected using interleaving in the signal received at the operating frequency.

13. The method of claim 7, characterized in that the tuning of at least one branch of the diversity receiver to other than the operating frequency is timed according to a timetable determined by the diversity receiver, an interval in the timetable between consecutive tunings of at least one branch of the diversity receiver to other than the operating frequency being inversely proportional to a relative received power, and proportional to the received power at the operating frequency, on some or several other carriers.

14. A method for making frequency specific measurements in a diversity receiver which comprises at least two reception branches, one of the two reception branches having a switch that has at least two states and a RAKE receiver including correlator branches which receives radio signals at an operating frequency, characterized in that:

in order to make measurements at other than the operating frequency, interrupting an impulse response measurement at the operating frequency carried out by a measuring block in the RAKE receiver; and setting said measuring block to carry out a measurement at said other than the operating frequency;

directing, when the switch is in a first state, a signal received by the reception branch having the switch to the RAKE receiver; and directing, when the switch is in a second state, the signal received by the reception branch having the switch to a measuring receiver.

15. A communications system (70) comprising base stations (71, 72) and terminals (76) of which at least one comprises a diversity receiver (77) which has at least two reception branches and a RAKE receiver, wherein the RAKE receiver includes correlator branches for combining signals received by different reception branches, the diversity receiver also has a measuring receiver to make measurements, and wherein at least one terminal is arranged so as to tune a first reception branch (12; 40) to frequencies other than of a second reception branch (13; 41) and to make measurements of both the signal produced by the first reception branch and the signal produced by the second reception branch, and the tuning of said first reception branch to said other frequencies is timed according to a certain predetermined timetable which is known to at least one base station.

16. A radio apparatus comprising a diversity receiver which has:

means for processing received signals in a first reception branch and a second reception branch;

a RAKE receiver comprising correlator branches and means for combining received signal components on baseband frequency;

measuring receiver means for making measurements;

means for tuning the first reception branch to a different frequency than the second reception branch and for making measurements of a signal produced by one reception branch simultaneously with the reception of a signal produced by the other reception branch; and in at least one reception branch, switching means for directing the signal received by said at least one reception branch having the switching means alternatively to said RAKE receiver or to said measuring receiver means.

17. A communications system comprising base stations and terminals of which at least one comprises a diversity receiver which has means for processing received signals in at least two reception branches and a RAKE receiver including correlator branches for combining signals received by different reception branches and which also has measuring receiver means for making measurements, wherein at least one terminal comprises means for tuning a first reception branch to other frequencies than a second reception branch and means for making measurements of both the signal produced by the first reception branch and the signal produced by the second reception branch, and means for timing the tuning of said first reception branch to other frequencies according to a certain predetermined timetable which is known to at least one base station.

* * * * *